United States Patent
Roberts et al.

(10) Patent No.: US 9,315,690 B2
(45) Date of Patent: *Apr. 19, 2016

(54) AQUEOUS PIGMENT DISPERSIONS BASED ON POLYURETHANE DISPERSANTS HAVING COMPONENTS TO INTERACT WITH CELLULOSE

(71) Applicant: E I DU PONT DE NEMOURS AND COMPANY, Wilmington, DE (US)

(72) Inventors: C. Chad Roberts, Hockessin, DE (US); Christian Jackson, Wilmington, DE (US); Patrick F. McIntyre, West Chester, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/368,671

(22) PCT Filed: Dec. 27, 2012

(86) PCT No.: PCT/IB2012/003082
§ 371 (c)(1),
(2) Date: Jun. 25, 2014

(87) PCT Pub. No.: WO2013/098652
PCT Pub. Date: Jul. 4, 2013

(65) Prior Publication Data
US 2015/0011703 A1    Jan. 8, 2015

Related U.S. Application Data

(60) Provisional application No. 61/581,756, filed on Dec. 30, 2011.

(51) Int. Cl.

| | |
|---|---|
| C08G 18/00 | (2006.01) |
| C09D 175/00 | (2006.01) |
| C09D 175/04 | (2006.01) |
| C08G 18/48 | (2006.01) |
| C08G 18/08 | (2006.01) |
| C08G 18/38 | (2006.01) |
| C08G 18/50 | (2006.01) |
| C08G 18/66 | (2006.01) |
| C08G 18/73 | (2006.01) |
| C08G 18/75 | (2006.01) |
| C08G 18/76 | (2006.01) |
| C08G 18/28 | (2006.01) |
| C08G 18/34 | (2006.01) |
| C08G 18/44 | (2006.01) |
| C09D 11/102 | (2014.01) |
| C09D 11/326 | (2014.01) |

(52) U.S. Cl.
CPC .......... *C09D 175/00* (2013.01); *C08G 18/0819* (2013.01); *C08G 18/0823* (2013.01); *C08G 18/0866* (2013.01); *C08G 18/2865* (2013.01); *C08G 18/348* (2013.01); *C08G 18/3831* (2013.01); *C08G 18/3848* (2013.01); *C08G 18/3872* (2013.01); *C08G 18/44* (2013.01); *C08G 18/4854* (2013.01); *C08G 18/4858* (2013.01); *C08G 18/5024* (2013.01); *C08G 18/6659* (2013.01); *C08G 18/6692* (2013.01); *C08G 18/73* (2013.01); *C08G 18/755* (2013.01); *C08G 18/765* (2013.01); *C09D 11/102* (2013.01); *C09D 11/326* (2013.01); *C09D 175/04* (2013.01)

(58) Field of Classification Search
CPC ............. C09D 175/04; C08G 18/4854; C08G 18/5024; C08G 18/755; C08G 18/765; C08G 18/0819; C08G 18/0866; C08G 18/348; C08G 18/3848; C08G 18/3872
See application file for complete search history.

(56) References Cited

U.S. PATENT DOCUMENTS

| | | | |
|---|---|---|---|
| 3,479,310 A | 11/1969 | Dieterich et al. | |
| 4,108,814 A | 8/1978 | Reiff et al. | |
| 4,408,008 A | 10/1983 | Markusch | |
| 5,022,592 A | 6/1991 | Zakheim et al. | |
| 5,026,427 A | 6/1991 | Mitchell et al. | |
| 5,085,698 A | 2/1992 | Ma et al. | |
| 5,679,138 A | 10/1997 | Bishop et al. | |
| 5,891,231 A | 4/1999 | Gnerlich et al. | |
| 5,976,232 A | 11/1999 | Gore | |
| 6,509,409 B1 * | 1/2003 | Thetford | B01F 17/005 524/589 |
| 6,627,761 B2 | 9/2003 | Klein et al. | |
| 6,632,858 B1 | 10/2003 | Pears et al. | |
| 6,852,803 B2 | 2/2005 | Ma | |

(Continued)

FOREIGN PATENT DOCUMENTS

| | | | | |
|---|---|---|---|---|
| JP | 05163450 A * | 6/1993 | ............ | C09D 11/10 |
| WO | 2012007254 A1 | 1/2012 | | |

OTHER PUBLICATIONS

Vora, Ankit; et al, "Novel tailor-made diols for polyurethane coatings using a combination of controlled radical polymerization, ring opening polymerization, and click chemistry", J. Coating Tech Research, 7(4), 409-419, (2010).

(Continued)

*Primary Examiner* — Michael L Leonard
(74) *Attorney, Agent, or Firm* — Simon L. Xu

(57) ABSTRACT

Aqueous pigment dispersions based on polyurethane dispersants having components capable of interacting with cellulose are described. These components include a heterocycle pendent and or terminal to the polymer chain. The heterocycle is selected based on its Hansen solubility parameters.

10 Claims, No Drawings

(56) References Cited

U.S. PATENT DOCUMENTS

| | | |
|---|---|---|
| 7,220,705 B2 | 5/2007 | Hare |
| 2003/0089277 A1 | 5/2003 | Zakheim et al. |
| 2003/0187136 A1 | 10/2003 | Maier et al. |
| 2005/0182180 A1 | 8/2005 | Martin et al. |
| 2007/0043198 A1 | 2/2007 | Madaj |
| 2007/0093618 A1 | 4/2007 | Cheng et al. |
| 2007/0100023 A1 | 5/2007 | Burns et al. |
| 2008/0214729 A1 | 9/2008 | Buter et al. |
| 2008/0264298 A1 | 10/2008 | Burns |
| 2009/0170986 A1 | 7/2009 | Brust et al. |
| 2010/0143589 A1 | 6/2010 | Spinelli et al. |
| 2011/0050784 A1 | 3/2011 | Yamamoto et al. |
| 2011/0084227 A1 | 4/2011 | Brown et al. |
| 2011/0245410 A1 | 10/2011 | Roberts et al. |

OTHER PUBLICATIONS

International Search Report, Dated Aug. 14, 2013 for PCT/IB12/03082, Issued by the USPTO.

* cited by examiner

AQUEOUS PIGMENT DISPERSIONS BASED ON POLYURETHANE DISPERSANTS HAVING COMPONENTS TO INTERACT WITH CELLULOSE

CROSS REFERENCE TO RELATED APPLICATIONS

This application claims priority under 35 U.S.C. §119 from U.S. Provisional Application Ser. No. 61/581,756, filed Dec. 30, 2011 which is incorporated by reference in its entirety.

BACKGROUND OF THE DISCLOSURE

The present disclosure pertains to aqueous pigment dispersions based on polyurethane dispersants having heterocyclic functionalities capable of interacting with cellulose. These dispersions may be used to prepare aqueous inkjet inks, paints, and the like.

Dispersion methods are commonly used to disperse particles. A variety of dispersion processes have been described for using polyurethane dispersants for dispersing particles. Often the components used for the polyurethane dispersants are chosen to optimize the stability of the pigment dispersion, rather than to optimize the utility of the pigment dispersions.

Alternatively, the polyurethane dispersants can be optimized to improve the performance of the pigments dispersed with these dispersants. For instance, components may be chosen for the polyurethane dispersants to improve pigmented ink performance. For inkjet inks with polyurethane dispersed pigments, components may be chosen to optimize the print performance of inkjet inks.

U.S. patent application publication Nos. 20080264298 and 20070100023 disclose dispersants capable of interacting with calcium components present in many types of paper.

There has been effort in the art directed at improving color saturation of images from inkjet printing. As the inkjet industry moves to page-wide array printing, the requirements for repeating jetting cycles may be an order of magnitude higher than the traditional Small Office/Home Office market. These and other emerging needs require inks with improved color saturation. The present disclosure satisfies this need by providing pigment dispersions based on polyurethane dispersants having functionalities capable of interacting with cellulose.

SUMMARY OF THE DISCLOSURE

An embodiment provides an aqueous pigment dispersion comprising a colorant and a polyurethane dispersant, wherein said polyurethane dispersant comprises at least one compound of the general structure of Formula I:

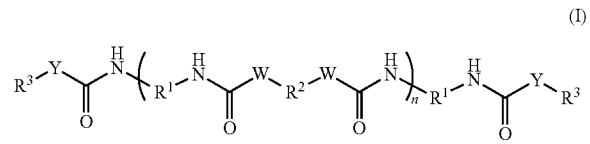

(I)

each Y is independently O, S or $NR^4$;
each W is N, O or S;
n is an integer from 2 to 30;
each $R^1$ is independently $C_1$-$C_{20}$ alkyl optionally substituted with one or more $R^5$, $OR^6$, $SR^6$ or $NR^7R^8$, or $C_6$-$C_{40}$ aryl optionally substituted with one or more $R^5$, $OR^6$, $SR^6$ or $NR^7R^8$;

each $R^2$ is comprised of difunctional isocyanate reactants $Z^1$, $Z^2$ and $Z^3$, wherein
$Z^1$ is a difunctional isocyanate reactant substituted with an aqueous dispersing ionic group, and $Z^1$ is present in between 5 to 40 weight percent of total weight of the polyurethane dispersant;
$Z^2$ is a difunctional or trifunctional isocyanate reactant selected from the group consisting of diol, diamine, amino alcohol, diamino alcohol, and amino dialcohol, and $Z^2$ is present in between 0 to 40 weight percent of total weight of the polyurethane dispersant; and
$Z^3$ is a difunctional isocyanate reactant substituted with $R^3$, and $Z^3$ is present in between 5 to 40 weight percent of total weight of the polyurethane dispersant; and
each $R^3$ is independently a monocyclic or bicyclic heterocycle containing N, S or O atoms on the ring bonding via a carbon or heteroatom to Y or $Z^2$ either directly or via a linking group containing 1-10 carbon atoms, wherein said heterocycle is selected from the group consisting of imidazole, imidazolidinone, oxazolidinone, thiazolidinone, benzotriazole, benzimidazole, triazole, benzotriazole, thiazole, benzothiazole, pyrimidine, pyridazine, pyrrolidone and glycoside, and wherein the carbon atoms on the ring of said heterocycle are optionally substituted with one or more $R^5$, $OR^6$, $SR^6$ or $NR^7R^8$, and the N atom or atoms on the ring of said heterocycle are optionally substituted with $R^5$ or $—R^9OR^6$;
each $R^5$ is independently $C_1$-$C_{20}$ alkyl, $C_3$-$C_{20}$ cycloalkyl or $C_6$-$C_{40}$ aryl;
each $R^6$ is independently H, $C_1$-$C_{20}$ alkyl, $C_3$-$C_{20}$ cycloalkyl or $C_6$-$C_{40}$ aryl; and
each $R^7$ and $R^8$ are independently H, $C_1$-$C_{20}$ alkyl, $C_3$-$C_{20}$ cycloalkyl or $C_6$-$C_{40}$ aryl; and
each $R^9$ is $C_1$-$C_5$ alkyl.

Another embodiment provides that $R^2$ further comprises $Z^4$, and $Z^4$ is a difunctional or trifunctional isocyanate reactant selected from the group consisting of a diol that contains a sulfone and a diamine that contains a sulfone.

Another embodiment provides that $Z^4$ is a diol that contains a sulfone.

Another embodiment provides that polyurethane dispersant is substituted with one or more crosslinkable moieties, and said crosslinkable moieties are selected from the group consisting of acetoacetoxy, acid, amine, epoxy, hydroxyl, blocked isocyanates, and mixtures thereof.

Another embodiment provides that polyurethane dispersant with substituted crosslinkable moieties is reacted with a crosslinking agent, and wherein said crosslinking agent is selected from a group consisting of acetoacetoxy, acid, amine, anhydride, epoxy, hydroxyl, isocyanates, blocked isocyanates and mixtures thereof.

Another embodiment provides that $R^3$ is independently a monocyclic or bicyclic heterocycle.

Another embodiment provides that heterocycle is oxazolidinone.

Another embodiment provides that heterocycle is imidazole.

Another embodiment provides that heterocycle is imidazolidinone.

Another embodiment provides that heterocycle is benzimidazole.

Another embodiment provides that heterocycle is triazole.

Another embodiment provides that said heterocycle is benzotriazole.

Another embodiment provides that heterocycle is thiazole.

Another embodiment provides that heterocycle is benzothiazole.

Another embodiment provides that heterocycle is pyrimidine.

Another embodiment provides that heterocycle is pyridazine.

Another embodiment provides that heterocycle is glycoside.

Another embodiment provides that heterocycle is pyrrolidone.

These and other features and advantages of the present embodiments will be more readily understood by those of ordinary skill in the art from a reading of the following Detailed Description. Certain features of the disclosed embodiments which are, for clarity, described above and below as separate embodiments, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Unless it is otherwise stated or clear from the context, when discussing properties or components of an inkjet ink, the term "inkjet ink" may be understood to include inkjet ink sets.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

As used herein, the term "dispersion of pigment particles" is a stable dispersion of polymeric dispersed pigments which are normally used in inks and paints.

As used herein, the term "aqueous pigment dispersion" is an aqueous dispersion of pigments using polymeric dispersants.

As used herein, the term "paper" means a semisynthetic product made by chemical processing of cellulosic fibers. The term paper also refers to the variety of paper used in printing such as copy paper, photo paper, newsprint, brochure paper and the like.

As used herein, the term "solubility parameter" provides a numerical estimate of the degree of interaction between materials, and can be a good indication of solubility, particularly for non-polar materials such as many polymers.

As used herein, the term "dispersant" means a surface active agent added to a suspending medium to promote uniform and maximum separation of extremely fine solid particles often of colloidal size. For pigments, the dispersants are most often polymeric dispersants and usually the dispersants and pigments are combined using dispersing equipment.

As used herein, the term "structured polymer" means a polymer that is composed of segments that differ in composition from each other. Examples include diblock, triblock, graft and star polymers.

As used herein, the term "random polymer" means a polymer that is composed of monomers distributed in a random fashion in the polymer in much the same mole ratio of the monomers in the initial monomer composition.

As used herein, the term "ionically stabilized dispersions", ("ISD") are polymerically stabilized dispersions where the stabilization is due to ionic stabilization with little or no steric stabilization.

As used herein, the term "dispersible particles" are those particles that can be dispersed with dispersants including polymeric dispersants.

As used herein, the term "stable dispersion" means a dispersion of particles where the particle size growth is less than 10% particle size growth and no flocculation when the dispersion is stored at room temperature for at least a week.

As used herein, the term "pigment" means any substance usually in a powder form which imparts color to another substance or mixture. Disperse dyes, white and black pigments are included in this definition.

As used herein, the term "P/D" means the pigment to dispersant weight ratio in the initial dispersion formulation.

As used herein, the term "ambient conditions" refers to surrounding conditions, which are often around one atmosphere of pressure, about 50% relative humidity, and about 25° C.

As used herein, the term "crosslinking" means the chemical reaction between reactive groups on at least two different chemicals, where one of the chemicals is at least disubstituted.

As used herein, the term "heterocycle" means a cyclic ring compound which consists of carbon atoms and at least one N, O, or S in the ring and contains 4-7 total atoms in ring. The carbon atom(s) on the ring may optionally form carbonyl group(s).

As used herein, the term "binder" means a film forming ingredient in the inkjet ink. This binder is normally added when the ink is formulated.

As used herein, the term "HSD" means High Speed Dispersing.

As used herein, the term "OD" means optical density.

As used herein, the term "color saturation" is defined as chroma normalized by lightness L*, in the CIELAB color space; this is:

$$s_{ab} = \frac{C^*_{ab}}{L^*}$$

where CIE is the International Commission on Illumination.

As used herein, the term "Gloss" means observation of reflected light from a printed surface, normally the printed substrate is glossy paper.

As used herein, the term "SDP" means "self-dispersible", "self-dispersing" or "self-dispersed" pigment.

As used herein, the term "aqueous vehicle" refers to water or a mixture of water and at least one water-soluble organic solvent (co-solvent).

As used herein, the term "ionizable groups", means potentially ionic groups.

As used herein, the term "substantially" means being of considerable degree, almost all.

As used herein, the term "Mn" means number average molecular weight usually reported in daltons.

As used herein, the term "Mw" means weight average molecular weight usually reported in daltons.

As used herein, the term "Pd" means the polydispersity which is the weight average molecular weight divided by the number average molecular weight.

As used herein, the term "D50" means the particle size at which 50% of the particles are smaller; "D95" means the particle size at which 95% of the particles are smaller.

As used herein, the term "cP" means centipoise, a viscosity unit.

As used herein, the term "conductivity" means the property of a substance or mixture that describes its ability to transfer electricity and is reported as mS/cm.

As used herein, the term "pre-polymer" means the polymer that is an intermediate in a polymerization process, and can also be considered a polymer.

As used herein, the term "AN" means acid number, mg KOH/gram of solid polymer.

As used herein, the term "neutralizing agents" means to embrace all types of agents that are useful for converting ionizable groups to the more hydrophilic ionic (salt) groups.

As used herein, the term "PUD" means the polyurethane dispersions described herein.

As used herein, the term "GPC" means gel permeation chromatography.

As used herein, the term "THF" means tetrahydrofuran.

As used herein, the term "DMPA" means dimethylol propionic acid.

As used herein, the term "TMXDI" means tetramethyl xylylene diisocyanate.

As used herein, Eternacoll® UH-50 is a polycarbonate diol from UBE Industries, Tokyo, Japan.

Denacol® 321 is trimethylolpropane polyglycidyl ether, a cross-linking reagent from Nagase Chemicals Ltd., Osaka, Japan.

As used herein, the term "DEA" means diethanolamine.

As used herein, the term "PROXEL™ biocide" refers to a biocide obtained from Arch Chemicals, Norwalk, Conn.

As used herein, the term "Surfynol 465" refers to surfactant from Air Products (Allentown, Pa. USA).

As used herein, the term "Glycereth-26" refers to a 26 mole ethylene oxide adduct of glycerin.

As used herein, the term "2-P (95/5)" means 2-Pyrrolidone supplied as a 5% water mixture.

As used herein, the term "ETEGMA//BZMA//MAA" means the block copolymer of ethyltriethyleneglycol methacrylate, benzylmethacrylate and methacrylic acid.

As used herein, the term "NMP" means n-Methyl pyrrolidone.

As used herein, the term "THF" means tetrahydrofuran.

As used herein, the term "DBTL" means dibutyltin dilaurate.

As used herein, the term "DMPA" means dimethylol propionic acid.

Denacol® 321 is trimethylolpropane polyglycidyl ether, a cross-linking reagent from Nagase Chemicals Ltd., Osaka, Japan.

As used herein, the term "DEA" means diethanolamine.

As used herein, the term "BMEA" means bis(methoxyethyl)amine.

As used herein, the term "Tetraglyme" means Tetraethylene glycol dimethyl ether.

As used herein, the term "PROXEL™ biocide" refers to a biocide obtained from Arch Chemicals, Norwalk, Conn.

As used herein, the term "Surfynol® 465" refers to surfactant from Air Products (Allentown, Pa. USA).

As used herein, the term "Glycereth-26" refers to a 26 mole ethylene oxide adduct of glycerin.

Unless otherwise noted, the above chemicals were obtained from Aldrich (Milwaukee, Wis.) or other similar suppliers of laboratory chemicals.

Polyurethane Dispersants

The science and art of producing stable dispersions utilizing organic polymeric dispersants has been studied and extensively developed. Different types of dispersants are characterized based on the perceived mechanism(s) of stabilization. Furthermore, dispersants may be employed to optimize end properties of the dispersed particle. In the case of inkjet inks, certain modification of dispersants can lead to better print performance without loss of the stability of the inkjet inks.

A model for effective use of pigments in inkjet inks is that a pigment is held onto the surface of a substrate resulting high optical density and other desirable print properties. Examples of "holding" the pigment onto the surface include using a fixing agent that reacts or effects the pigment when it is jetted onto the substrate, using self-dispersing pigment, using dispersants that are designed to interact with calcium as suggested in US20080264298 and US200070100023, etc. Calcium carbonate is often a component of paper, especially for copy paper and similar papers used for inkjet printing.

While seeking new ways to obtain high OD and achieve high saturation printed images from inkjet inks, a set of heterocycles was identified as capable of interacting with cellulose which is the predominant component in paper. These heterocycles were selected by matching their Hansen solubility parameters with that of cellulose. Inclusion of these heterocycles in polyurethanes provides the polyurethane dispersants of the present disclosure. While not being bound by theory, it is concluded that if a dispersant contains substituents that can interact with cellulose, the resulting inkjet inks will behave differently. Upon jetting on paper, the dispersant can interact with the paper, leaving the pigment to be fixed at or near the top of the paper to optimize print optical densities and color saturation.

Accordingly, polyurethane dispersants containing heterocycles capable of interacting with cellulose were prepared. In one embodiment, an aqueous pigment dispersion comprising a colorant and a polyurethane dispersant was prepared. The polyurethane dispersant comprises at least one compound of the general structure of Formula I:

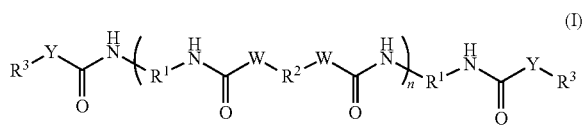

(I)

each Y is independently O, S or NR$^4$;
each W is N, O or S;
n is an integer from 2 to 30;
each R$^1$ is independently C$_1$-C$_{20}$ alkyl optionally substituted with one or more R$^5$, OR$^6$, SR$^6$ or NR$^7$R$^8$, or C$_6$-C$_{40}$ aryl optionally substituted with one or more R$^5$, OR$^6$, SR$^6$ or NR$^7$R$^8$;
each R$^2$ is comprised of difunctional isocyanate reactants Z$^1$, Z$^2$ and Z$^3$, wherein
Z$^1$ is a difunctional isocyanate reactant substituted with an aqueous dispersing ionic group, and Z$^1$ is present in between 5 to 40 weight percent of total weight of the polyurethane dispersant;
Z$^2$ is a difunctional or trifunctional isocyanate reactant selected from the group consisting of diol, diamine, amino alcohol, diamino alcohol, and amino dialcohol, and Z$^2$ is present in between 0 to 40 weight percent of total weight of the polyurethane dispersant; and
Z$^3$ is a difunctional isocyanate reactant substituted with R$^3$, and Z$^3$ is present in between 5 to 40 weight percent of total weight of the polyurethane dispersant; and
each R$^3$ is independently a monocyclic or bicyclic heterocycle containing N, S or O atoms on the ring bonding via a carbon or heteroatom to Y or Z$^2$ either directly or via a linking group containing 1-10 carbon atoms, wherein said heterocycle is selected from the group consisting of imidazole, imidazolidinone, oxazolidinone, thiazolidinone, benzotriazole, benzimidazole, triazole, benzotriazole, thiazole, benzothiazole, pyrimidine, pyridazine, pyrrolidone and glycoside, and wherein the carbon atoms on the ring of said heterocycle are optionally substituted with one or more R$^5$, OR$^6$, SR$^6$ or NR$^7$R$^8$, and the N atom or atoms on the ring of said heterocycle are optionally substituted with R$^5$ or —R$^9$OR$^6$;
each R$^5$ is independently C$_1$-C$_{20}$ alkyl, C$_3$-C$_{20}$ cycloalkyl or C$_6$-C$_{40}$ aryl;
each R$^6$ is independently H, C$_1$-C$_{20}$ alkyl, C$_3$-C$_{20}$ cycloalkyl or C$_6$-C$_{40}$ aryl; and
each R$^7$ and R$^8$ are independently H, C$_1$-C$_{20}$ alkyl, C$_3$-C$_{20}$ cycloalkyl or C$_6$-C$_{40}$ aryl; and each R$^9$ is C$_1$-C$_5$ alkyl.

In another embodiment, R$^2$ of the polyurethane further comprises Z$^4$, and Z$^4$ is a difunctional or trifunctional isocyanate reactant selected from the group consisting of a diol that contains a sulfone and a diamine that contains a sulfone.

The key features of the polyurethane dispersant are the moieties or substituents that are capable of interacting with cellulose. These moieties or substituents are pendent to the polymer backbone and/or terminal to the polymer chain. The term "pendent" means that a substituent is directly attached to the backbone of a polymer or via a linkage of between 1 to 10 atoms.

The R$^2$ group in Formula I is comprised of difunctional isocyanate reactants Z$^1$, Z$^2$ and Z$^3$, wherein there is at least one Z$^1$ and at least one Z$^3$. This R$^2$ group provides the polyurethanes with significant areas of hydrophobic segment which can be effective in dispersing pigments. While not being bound by theory, these areas of hydrophobic segment may be effective as the part of the dispersant that is associated with the pigment surfaces. The polyurethane dispersant must have at least one Z$^1$ and at least one Z$^3$ to satisfy the requirements that the polyurethane contains an aqueous dispersing moiety, and at least one component capable of interacting with cellulose. The blending of Z$^1$, Z$^2$ and Z$^3$ in the polyurethane can be in any sequence. Depending on the sequence of addition during the synthesis of the polyurethane, the R$^2$ component (combination of Z$^1$, Z$^2$ and Z$^3$) can be random or in blocks.

Ionic Difunctional Isocyanate Reactant (Z$^1$)

The difunctional isocyanate reactant Z$^1$ in Formula I contains an aqueous dispersing moiety that is ionic or ionizable. In the context of this disclosure, the term "isocyanate reactant", or "isocyanate reactive", is taken to include groups well known to those of ordinary skill in the relevant art to react with isocyanates, and typically include hydroxyl, primary amino and secondary amino groups. The term "difunctional" means containing two of the isocyanate reactive groups.

Examples of ionic dispersing groups include carboxylate groups (—COOM), phosphate groups (—OPO$_3$M$_2$), phosphonate groups (—PO$_3$M$_2$), sulfonate groups (—SO$_3$M), and quaternary ammonium groups (—NR$_3$Q), wherein M is a cation such as a monovalent metal ion (e.g., Na$^+$, K$^+$, Li$^+$, etc.), H$^+$ or NR$_4^+$; Q is a monovalent anion such as chloride or hydroxide; and each R can independently be an alkyl, aralkyl, aryl or hydrogen. These ionic dispersing groups are typically located pendent to the polyurethane backbone.

The ionizable groups in general correspond to the ionic groups, except that they are in the acid (such as carboxyl —COOH) or base (such as primary, secondary or tertiary amine —NH$_2$, —NRH, or —NR$_2$) form. The ionizable groups are such that they are readily converted to their ionic form during the dispersion/polymer preparation process as discussed below.

With respect to compounds which contain isocyanate reactive groups and ionic or potentially ionic groups, the isocyanate reactive groups are typically amino and hydroxyl groups. The potentially ionic groups or their corresponding ionic groups may be cationic or anionic, although the anionic groups are preferred. Specific examples of anionic groups include carboxylate and sulfonate groups. Examples of cationic groups include quaternary ammonium groups and sulfonium groups.

In the case of anionic group substitution, the groups can be carboxylic acid groups, carboxylate groups, sulphonic acid groups, sulphonate groups, phosphoric acid groups and phosphonate groups, The acid salts are formed by neutralizing the corresponding acid groups either prior to, during or after formation of the NCO prepolymer.

Suitable compounds for incorporating carboxyl groups are described in U.S. Pat. Nos. 3,479,310, 4,108,814 and 4,408,008. Examples of carboxylic group-containing compounds are the hydroxy-carboxylic acids corresponding to the formula (HO)$_p$Q(COOH)$_q$, wherein Q is C$_1$-C$_{10}$ alkyl, p is 1 or 2, and q is 1 to 3. Examples of these hydroxy-carboxylic acids include citric acid, tartaric acid and hydroxypivalic acid. Optional dihydroxy alkanoic acids include the α,α-dimethylol alkanoic acids represented by the structure of Formula II below:

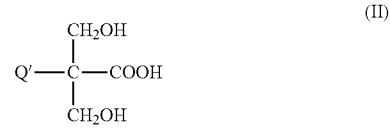

(II)

wherein Q' is hydrogen or $C_1$-$C_8$ alkyl. Additional α,α-dimethylol alkanoic acids are represented by the structural formula $R^5C$—$(CH_2OH)_2$—COOH, wherein $R^5$ is hydrogen or $C_1$-$C_8$ alkyl. Examples of these ionizable diols include, but are not limited to, dimethylolacetic acid, 2,2'-dimethylolbutanoic acid, 2,2'-dimethylolpropionic acid (DMPA), and 2,2'-dimethylolbutyric acid. Suitable carboxylates also include $H_2N$—$(CH_2)_4$—$CH(CO_2H)$—$NH_2$, and $H_2N$—$CH_2$—$CH_2$—NH—$CH_2$—$CH_2$—$CO_2Na$.

Typical sulfonate groups for incorporation into the polyurethanes include diol sulfonates described in U.S. Pat. No. 4,108,814. Suitable diol sulfonate compounds also include hydroxyl terminated copolyethers comprising repeat units derived from the reaction of a diol and a sulfonated dicarboxylic acid. Specifically, the sulfonated dicarboxylic acid is 5-sulfo-isophthalic acid and the diol is 1,3-propanediol. Other suitable sulfonates include the ones represented by formula $H_2N$—$CH_2$—$CH_2$—NH—$(CH_2)_r$—$SO_3Na$, wherein r is 2 or 3.

When the ionic stabilizing groups are acids, the acid groups are incorporated in an amount sufficient to provide an acid group content for the polyurethane, known by those skilled in the art as acid number (mg KOH per gram solid polymer), of at least 6, typically at least 10, and even more typically 20 milligrams KOH per 1.0 gram of polyurethane. The upper limit for the acid number (AN) is about 120, and typically about 100.

Within the context of this disclosure, the term "neutralizing agents" is meant to embrace all types of agents which are useful for converting potentially ionic or ionizable groups to ionic groups. When amines are used as the neutralizing agent, the chain terminating reaction producing the urea termination is typically completed prior to the addition of the neutralizing agent that can also act as an isocyanate reactive group.

In order to convert an anionic group to its salt form before, during or after its incorporation into a prepolymer, either volatile or nonvolatile basic materials may be used to form the counterion of the anionic group. Volatile bases are those wherein at least about 90 of the base used to form the counterion of the anionic group volatilizes under the conditions used to remove water from the aqueous polyurethane dispersions. Nonvolatile bases are those wherein at least about 90% of the base does not volatilize under the conditions used to remove water from the aqueous polyurethane dispersions.

Suitable volatile basic organic compounds for neutralizing the potential anionic groups are the primary, secondary or tertiary amines. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethyl-ethanol amine, triethanolamine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone.

Suitable nonvolatile bases include alkoxides, hydroxides, carbonates or bicarbonates of monovalent metals, especially the alkali metals, lithium, sodium and potassium.

When the anionic groups on the polyurethane are neutralized, they provide hydrophilicity to the polymer and better enable it to stably disperse pigment in water. However, it may be desirable to control the degree of neutralization. When the anionic groups on the polyurethane are partially neutralized, the polyurethane becomes more hydrophobic and therefore adsorbs onto the pigment surface. Reducing the amount of the un-adsorbed polymer from the pigment dispersion provides an advantageous condition for the cross-linkable moieties on the polyurethane, adsorbing onto the pigment surface, to react with a cross-linking agent without the competition from cross-linkable moieties on the un-adsorbed polyurethane. Typically the degree of neutralization is from 40% to 100%, and more typically from 50% to 70%, depending on the acid number of the polyurethane.

Difunctional Isocyanate Reactant ($Z^2$)

Suitable $Z^2$ diols contain at least two hydroxyl groups, and have a molecular weight of from about 60 to about 6000. Of these, the polymeric first diols are best defined by the number average molecular weight, and can range from about 200 to about 6000, specifically, from about 400 to about 3000, and more specifically from about 600 to about 2500. The molecular weights can be determined by hydroxyl group analysis (OH number).

$Z^2$ diol includes those that are derived from monomeric 1,n-diols where n is at least 3 and can be up to about 36.

$Z^2$ can be from polyester diols, polyether diols, polycarbonate diols, polyester carbonate diols and polyacrylate diols. Other isocyanate reactive components are chosen for their stability to hydrolysis, adhesion, toughness, and balance of hydrophilicity and hydrophobicity.

Examples of polymeric polyols include polyesters, polyethers, polycarbonates, polyacetals, poly(meth)acrylates, polyester amides, and polythioethers. A combination of these polymers can also be used. For examples, a polyether polyol and a poly(meth)acrylate polyol may be used in the same polyurethane synthesis.

Examples of polymeric polyols include polyesters, polyethers, polycarbonates, polyacetals, poly(meth)acrylates, polyester amides, and polythioethers. A combination of these polymers can also be used. For examples, a polyether polyol and a poly(meth)acrylate polyol may be used in the same polyurethane synthesis. In the case of using a polyether polyol, both ionic and nonionic stabilization (from the polyether polyol) can contribute to the stabilization of the polyurethane pigment dispersion.

When the $Z^2$ diol is a polyether diol, the polyether diol may be derived from ethylene oxide, propylene oxide and higher oxetanes. The polyether diol has the formula HO [—(CHR)a-O-]b-H where R is hydrogen or alkyl with 1 to 12 carbons; a and b are integers; a is greater than or equal to 2 to 18; and b is greater than or equal to 2 to about 150. Suitable polyether diols have b equal to 3 or 4. Commercially available compounds for when a=3 and b is greater than 3 include Ceranol™ polyether polyols from DuPont, Wilmington Del. Commercially available compounds for when a=4 and b is greater than 3 include TERATHANE polytetramethylene ether glycols (PTMEG) available from Invista, Wichita, Kans.

$Z^2$ components may comprise polymeric polyols along with up to 30 mol %, of the total isocyanate reactive components, trisubstituted asymmetric branching compound where the trisubstituted asymmetric branching compound has three isocyanate-reactive substituents where the first isocyanate-reactive substituent is a primary or a secondary amine, and the second and third isocyanate-reactive substituents are the same or different and are selected from the group consisting of a primary or secondary amine, —OH, —PH and —SH and where at least one of the second and third-isocyanate reactive substituents are —OH or —SH.

In general, a trisubstituted asymmetric branching compound is an aliphatic compound with the three isocyanate-reactive substituents. Non-limiting examples of the trisubstituted asymmetric branching compound include diethanolamine, bis-(hydroxylmethyl)-methylamine, dipropanolamine, 1,5-diamino-3-(2-hydroxy ethyl)pentane, and 2-aminoethane-(2 hydroxy ethyl)amine.

Cellulose Interacting Isocyanate Reactant ($Z^3$ and $Z^4$)

Cellulose interacting, isocyanate reactants may be based on diols or diamines containing a pendant heterocycle functionality ($Z^3$) or diols/diamines containing phenyl sulfone functionalities ($Z^4$).

Heterocycle Containing Isocyanate Reactant ($Z^3$)

$Z^3$ are structural similar except $Z^2$ will contain a pendant cellulose interactive substituent in the form of the heterocycle, selected from the group consisting of imidazole, imidazolidinone, oxazolidinone, thiazolidinone, benzotriazole, benzimidazole, triazole, benzotriazole, thiazole, benzothiazole, pyrimidine, pyridazine and glycoside, and pyrrolidone. The heterocycle can be separated from the chain of the difunctional isocyanate reactive group by a linking group with 0-10 carbon atoms.

Diols with pendant cellulose interacting heterocycles may be synthesized in-situ. As previously disclosed in WO2012007254 and U.S. Pat. No. 6,627,761, glycerin carbonate terminated isocyantes reacts with primary diamines to form beta-hydroxy polyurethanes, and in addition, glycerin carbonate reacts with a monoamine to form a diol with a urethane pendant group from the monoamine (J. Coating Tech Res, 7(4) 409-419, 2010). Thus, diol with pendant heterocycle may be synthesized in-situ using a regent such as glycerine carbonate where in the latent diol (glycerin carbonate) is reacted with a primary amine compound containing the cellulose interacting heterocycle. Examples of these primary amine compounds with cellulose interacting heterocycles include N-(2-Aminoethyl)-2-pyrrolidone, 1-(2-aminoethyl)-3-methyl-2-Imidazolidinone, 1-(2-Aminoethyl)benzotriazole, N-(3-aminopropyl)-2-pyrrolidone, 1-(3-aminopropyl)-3-methyl-2-Imidazolidinone, and 1-(3-aminopropyl)imidazole. The heterocycle containing monoamine is reacted with glycerine carbonate to form a diol with pendant alkyl phenyl sulfone which is in a continuous process reacted with a diisocyanate forming a polyurethane with pendant cellulose interacting heterocycle functionality.

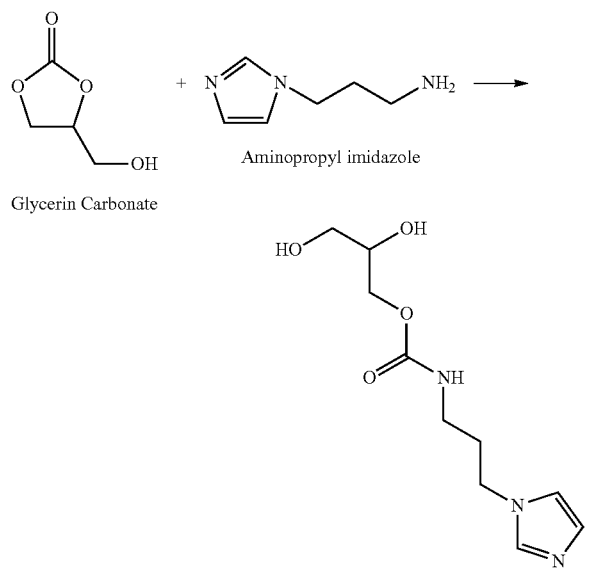

Glycerin Carbonate

Aminopropyl imidazole

Sulfone Containing Isocyanate Reactant ($Z^4$)

$Z^4$ reactant is a difunctional or trifunctional. isocyanate reactant selected from the group consisting of a diol which contains a sulfone and a diamine that contains a sulfone. Examples of the sulfone include both aromatic and aliphatic compounds such as bis(2-hydroxyethyl)sulfone, bis(hydroxyethoxy)phenyl sulfone and 4,4'-diaminophenyl sulfone.

Pendant sulfone containing diols may also be derived in-situ from glycerin carbonate reaction with mono-amines containing sulfone functionality. For examples, 3-(phenylsulfonyl)-1-propanamine is reacted with glycerine carbonate to form a diol with pendant alkyl phenyl sulfone which can immediately be reacted with a diisocyanate forming a polyurethane with pendant sulfone functionality.

Capping of the Polyurethane

The capping agent for terminating the polyurethane chain is usually a primary or secondary amine, an alcohol, or a mecapto. The heterocycle compound may be a substituent on the capping agent. This capping agent terminates the polyurethane and does not chain extend the polyurethane. The amount of capping agent employed should be approximately equivalent to the free isocyanate groups in the prepolymer. The ratio of active hydrogens from amine in the capping agent to isocyanate groups in the prepolymer is in the range of from about 1.0:1.0 to about 3.0:1.0, more typically from about 1.0:1.0 to about 1.5:1.0, and still more typically from about 1.0:1.0 to about 1.05:1, on an equivalent basis. Although any isocyanate groups that are not terminated with an amine can react with other isocyanate reactive functional group or water, the ratios of capping agent to isocyanate group is chosen to ensure a urea termination. Amine termination of the polyurethane is avoided by the choice and amount of capping agent leading to a urea terminated polyurethane. This results in better molecular weight control and better properties when used as a particle dispersant, and ease in handling when added to formulations.

Any primary or secondary amines substituted with reactive isocyanate groups may be used as chain terminators. Especially useful are aliphatic primary or secondary monoamines, or diamines. Less reactive isocyanate groups such as hydroxyl, carboxyl, and mercapto could also be used. Example of amines useful as chain terminators include, but are not restricted to, diethanolamine, monoethanolamine, 3-amino-1-propanol, isopropanolamine, N-ethylethanolamine, diisopropanolamine, 6-aminocaproic acid, 8-aminocaprylic acid, bis(methoxyethyl)amine, and 3-aminoadipic acid.

In this invention, the preferred chain terminator contains cellulose interacting heterocycle. Examples of chain terminator with cellulose interacting heterocycles include N-(2-Aminoethyl)-2-pyrrolidone, 1-(2-aminoethyl)-3-methyl-2-Imidazolidinone, 1-(2-Aminoethyl)benzotriazole, N-(3-aminopropyl)-2-pyrrolidone, 1-(3-aminopropyl)-3-methyl-2-Imidazolidinone, and 1-(3-aminopropyl)imidazole.

Polyisocyanate Component

Suitable polyisocyanates are those that contain either aromatic, cycloaliphatic or aliphatic groups bound to the isocyanate groups. Mixtures of these compounds may also be used. If aromatic isocyanates are used, cycloaliphatic or aliphatic isocyanates can be present as well.

Any diisocyanate useful in preparing polyurethanes via its reaction with polyether glycols, diols or amines can be used in this invention.

Examples of suitable diisocyanates include, but are not limited to, 2,4-toluene diisocyanate (TDI), 2,6-toluene diisocyanate, trimethyl hexamethylene diisocyanate (TMDI), 4,4'-diphenylmethane diisocyanate (MDI), 4,4'-dicyclohexylmethane diisocyanate ($H_{12}MDI$), 3,3'-dimethyl-4,4'-biphenyl diisocyanate (TODI), dodecane diisocyanate ($C_{12}$DI), m-tetramethylene xylylene diisocyanate (TMXDI), 1,4-benzene diisocyanate, trans-cyclohexane-1,4-diisocyanate, 1,5-naphthalene diisocyanate (NDI), 1,6-hexamethylene diisocyanate (HDI), 4,6-xylylene diisocyanate, isophorone diisocyanate (IPDI), and combinations thereof.

Small amounts, typically less than about 3% by weight based on the weight of the diisocyanate, of monoisocyanates or polyisocyanates can be used in a mixture with the diisocyanate. Examples of useful monoisocyanates include alkyl isocyanates such as octadecyl isocyanate and aryl isocyanates such as phenyl isocyanate. Examples of useful polyisocyanates are triisocyanatotoluene HDI trimer and polymeric MDI.

Pigments

Pigments suitable for use in the present invention are those generally well known in the art for aqueous inkjet inks. Representative commercial dry pigments are listed in U.S. Pat. No. 5,085,698. Dispersed dyes are also considered pigments as they are insoluble in the aqueous inks used herein.

A wide variety of organic and inorganic pigments, alone or in combination, may be selected to make the ink. The term "pigment" as used herein means an insoluble colorant which includes dispersed dyes as they are insoluble in the inkjet ink. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron, and in embodiments, the pigment particle size ranges from about 0.005 to about 5 micron, and in embodiments, from about 0.005 to about 1 micron. The average particle size as measured by dynamic light scattering is preferably less than about 500 nm, more preferably less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form.

The dispersed pigment may be purified after the dispersion process by filtration, ultrafiltration or other processes used for purification of dispersed pigments.

Dispersion of the Pigment Particles

The dispersing step for the polymerically dispersed pigment may be accomplished in an ultrasonicator, media mill, a horizontal mini mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). The media for the media mill is chosen from commonly available media, including zirconia, YTZ, and nylon. The media can be as small as about 0.1 microns, although particles larger than 0.3 microns are commonly used. These various dispersion processes are in a general sense well known in the art, as exemplified by U.S. Pat. No. 5,022,592, U.S. Pat. No. 5,026,427, U.S. Pat. No. 5,891,231, U.S. Pat. No. 5,679,138, U.S. Pat. No. 5,976,232 and US Patent Application Publication No. 20030089277. Preferred are media mill, and by-passing the mixture through a plurality of nozzles within a liquid jet interaction chamber at a liquid pressure of at least 5,000 psi. The mixing intensity required for the process is mixing normally associated with dispersion processes and not turbulent mixing of more modest mixing processes.

Combinations of dispersing equipment may be used. It may be more convenient to mix the solvent mixture, particle and polymeric dispersant in a High Speed Disperser (HSD) followed by milling in a media mill or a microfluidizer. The addition of the polar solvent may occur during the HSD portion of the processing and then the milling is continued in the media mill.

The final use of the particle dispersion may require that the solvent be removed from the particle dispersion mixture. The solvent may be removed by distillation processing, ultrafiltration or other convenient means. Any of these solvent removal methods may be incorporated into the process. The dispersing equipment and the solvent removal may be coupled and the solvent may be removed during the dispersing process and during the addition of the polar solvent.

One way to monitor the progress of the dispersion process is to measure the particle size and set a target value for the final D50 of the mixture. For typical pigments used for inkjet inks the target value of the D50 is 125 nm or less, preferably less than 100 nm. Also the D95 and the particles smaller than 204 nm can be used as a test criterion for the pigment dispersions.

A wide variety of organic and inorganic pigments, alone or in combination, may be selected for dispersion by this process. The dispersed pigment may be used in paints, inks and especially inkjet inks. The term "pigment" as used herein means an insoluble colorant and in the present application includes disperse dyes. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss.

The dispersed pigment may be purified after the dispersion process by filtration, ultrafiltration or other processes used for purification of dispersed pigments.

Crosslinked Polymeric Dispersant

The polymeric dispersant may be crosslinked after the pigment dispersion is prepared.

Polymeric dispersants substituted with crosslinkable moieties including acetoacetoxy, acid, amine, epoxy, hydroxyl, blocked isocyanates and mixtures are capable of undergoing crosslinking. Typically, a crosslinking agent is added to effect crosslinking. Typical crosslinking agents include acetoacetoxy, acid, amine, anhydride, epoxy, hydroxyl, isocyanates, blocked isocyanates, and mixtures thereof. The crosslinking of the polymeric dispersant is typically conducted after the pigment is dispersed. After the crosslinking step, excess polymeric dispersant can be removed by purification processes such as ultrafiltration.

Specific examples of crosslinking moiety/agent pairs are hydroxyl/isocyanate and acid/epoxy.

The product of this crosslinking process is a stable, dispersed pigment. This stable pigment dispersion is one that has less than 10% particle size growth and no flocculation when the dispersion is stored at room temperature for at least a week. More rigorous testing that entails accelerated testing by heating samples for a week or more can also be used to determine the stability of the particle dispersions. The optimal particle dispersion stability would depend on the dispersion's characteristics and/or final use. Another criterion for a stable dispersed particle is that it can be processed under normal dispersing process conditions, without turning into a gel or having other adverse properties.

Amounts/Ratios of the Ingredients

For inkjet inks, the mass ratio of pigment to polymeric dispersant ranges from 0.33 to 400. This ratio is based on the mass of the pigment and that of the polymeric dispersant added to the dispersion. For organic pigments the ratio is 0.33 to 12, optionally 0.5 to 10. For inorganic pigments the ratio is 3 to 400, optionally 5 to 200.

In the case of organic pigments, the inkjet ink may contain up to approximately 30% of the pigment, optionally 0.11 to 25%, and further from 0.25 to 15% pigment by weight based on the total ink weight of the ink. If an inorganic pigment is selected, the ink will tend to contain higher weight percentages of pigment than with comparable inks employing organic pigment, and the ink may be as high as 75% in some cases, since inorganic pigments generally have higher specific gravities than organic pigments. Examples of inorganic pigments include titanium dioxide, iron oxides, and the like.

Aqueous Carrier Medium

The aqueous carrier medium (aqueous vehicle) for the inkjet inks which utilize the encapsulated pigment described above is water or a mixture of water and at least one water-miscible organic solvent. Selection of a suitable mixture depends on requirements of the specific application, such as desired surface tension and viscosity, the selected pigment, drying time of the pigmented inkjet ink, and the type of paper onto which the ink will be printed. Representative examples of water-soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thiodiglycol; (6) lower alkyl mono- or di-ethers derived from alkylene glycols, such as ethylene glycol mono-methyl (or -ethyl)ether, diethylene glycol mono-methyl (or -ethyl)ether, propylene glycol mono-methyl (or -ethyl)ether, triethylene glycol mono-methyl (or -ethyl)ether and diethylene glycol di-methyl (or -ethyl)ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A mixture of water and a polyhydric alcohol, such as diethylene glycol, is preferred as the aqueous carrier medium. In the case of a mixture of water and diethylene glycol, the aqueous carrier medium usually contains from 30% water/70% diethylene glycol to 95% water/5% diethylene glycol. The preferred ratios are approximately 60% water/40% diethylene glycol to 95% water/5% diethylene glycol. Percentages are based on the total weight of the aqueous carrier medium. A mixture of water and butyl carbitol is also an effective aqueous carrier medium.

The amount of aqueous carrier medium in the ink is typically in the range of 70% to 99.8%, and preferably 80% to 99.8%, based on total weight of the ink.

The aqueous carrier medium can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from 1 to 15% by weight and more typically 2 to 10% by weight, based on the total weight of the ink. Surfactants may be used, typically in the amount of 0.01 to 5% and preferably 0.2 to 4%, based on the total weight of the ink.

Other Additives

Other ingredients, additives, may be formulated into the inkjet ink, to the extent that such other ingredients do not interfere with the stability and jettability of the inkjet ink. This may be readily determined by routine experimentation by one skilled in the art.

Surfactants are commonly added to inks to adjust surface tension and wetting properties. Suitable surfactants include the ones disclosed in the Vehicle section above. Surfactants are typically used in amounts up to about 5% and more typically in amounts up to 2% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They also can be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Typical classes of polymer additives include anionic acrylic, styrene-acrylic and polyurethane polymer.

When a polymer is present, its level is typically between about 0.01% and about 3% by weight, based on the total weight of an ink. The upper limit is dictated by ink viscosity or other physical limitations.

Ink Sets

The term "ink set" refers to all the individual inks or other fluids an inkjet printer is equipped to jet. Ink sets typically comprise at least three differently colored inks. For example, a cyan (C), magenta (M) and yellow (Y) ink forms a CMY ink set. More typically, an ink set includes at least four differently colored inks, for example, by adding a black (K) ink to the CMY ink set to form a CMYK ink set. The magenta, yellow and cyan inks of the ink set are typically aqueous inks, and may contain dyes, pigments or combinations thereof as the colorant. Such other inks are, in a general sense, well known to those of ordinary skill in the art.

In addition to the typical CMYK inks, an ink set may further comprise one or more "gamut-expanding" inks, including differently colored inks such as an orange ink, a green ink, a red ink and/or a blue ink, and combinations of full strength and light strength inks such as light cyan and light magenta. Such other inks are, in a general sense, known to one skilled in the art.

A typical ink set comprises a magenta, yellow, cyan and black ink, wherein the black ink is an ink according to the present disclosure comprising an aqueous vehicle and a self-dispersing carbon black pigment. Specifically, the colorant in each of the magenta, yellow and cyan inks is a dye.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Although not restricted to any particular viscosity range or printhead, the inventive ink set is particularly suited to lower viscosity applications such as those required by thermal printheads. Thus the viscosity of the inventive inks at 25° C. can be less than about 7 cP, typically less than about 5 cP, and more typically than about 3.5 cP. Thermal inkjet actuators rely on instantaneous heating/bubble formation to eject ink drops and this mechanism of drop formation generally requires inks of lower viscosity.

Substrate

The present embodiments are particularly advantageous for printing on plain paper, such as common electrophotographic copier paper and photo paper, glossy paper and similar papers used in inkjet printers.

EXAMPLES

The following examples illustrate various embodiments of the present disclosure without, however, being limited thereto. Tests listed here are those that are commonly used for testing pigment dispersions and inkjet inks.

The particle size for the pigment dispersions and the inks were determined by dynamic light scattering using a MICROTRAC UPA 150 analyzer from Honeywell/Microtrac (Montgomeryville Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution. Results are reported as D50 and D95 and particles less than 204 nm.

MW Characterization of the Polyurethane Dispersants

Gel Permeation Chromatography or GPC was used to verify predicted molecular weight and molecular weight distribution. The GPC system included a Waters 1515 Isocratic HPLC Pump, Waters 2414 Refractive Index Detector, 717 plus Waters Autosampler, Four Styregel Columns (HR 0.5, HR 1, HR 2, and HR 4) in series in a Waters Column Heater set to 40° C. Samples were eluted with Tetrahydrofuran (THF) at a flow rate of 1 mL/min. The samples were analyzed using Breeze 3.30 Software with a calibration curve developed from narrow molecular weight, polymethylmethacrylate (PMMA) standards. Based on light scattering data from Polymer Laboratories Ltd., the nominal, peak molecular weight for the PMMA standards were as follows: 300000, 150000, 60000, 30000, 13000, 6000, 2000, and 1000.

The inks were tested by printing on various substrates with HP and Epson printers. Plain paper, glossy paper and brochure paper were tested.

The optical density was measured using a Greytag-Macbeth SpectroEye™ instrument (Greytag-Macbeth AG, Regensdorf, Switzerland).

The durability of the image towards highlighter smear was done using a Faber-Castel highlighter pen after the printed image was allowed to dry for one hour after printing. The image was marked twice, the first mark was with a single pass with the highlighter and the second mark was with two passes with the highlighter. These highlighter marks were tested by measuring the optical density in the region on the smear adjacent to the printed image. The optical density is corrected for a highlighter that is not drawn across the printed image. That is, after the highlighter is drawn across the printed marks the OD is measured in the yellow highlighted area adjacent to the printed marks. In this area will be the highlighter and the transferred pigment. The amount of optical density measured is an indication of how much of the printed image is smeared and a higher number demonstrates a worse result. This smear is reported in milliOD units.

Polyurethane Dispersant 1: TMDI/GC-ApizDiol HEPS APIZ 60AN

Loaded 2 L reactor with 44.02 g bis(hydroxyethoxy)phenyl sulfone, 228.09 g 95% Sulfolane (5% Proglyde DMM), 38.86 g 1-(3-Aminopropyl)imidazole, and 53.57 g dimethylol proprionic acid. The reaction was heated to 73° C. Over 25 minutes 267.8 g isophorone diisocyanate was added followed by 27 g Sulfolane (5% Proglyde DMM). Glycerin Carbonate (38.58 g) was feed over 10 minutes, and the reaction mixture was heated at 80° C. for 2 hrs. Over 30 minutes 187.68 g Vestanat TMDI (2,2,4-Trimethyl-hexamethylene diisocyanate & 2,4,4-isomer) was added followed by 31.68 g Sulfolane (5% Proglyde DMM). The reaction was held at 81° C. for 1.5 hrs when the uncorrected NCO titration was −1.65%. Then, 16.11 g aminopropyl imidazole was added over 10 minutes.

The reaction was held at 81° C. for 4 hrs when the % NCO was 1.16%. Then, 200 g Sulfolane (5% Proglyde DMM) and 21.5 g aminopropyl imidazole was added over 10 minutes. The reaction was held at 80-90° C. for 1 hr. The polyurethane solution was inverted under high speed mixing by adding a mixture of 45% KOH (45.12 g) and 824.25 g water followed by 2.43 g proxel GXL. The polyurethane dispersion had a viscosity of 114 cPs, 23.54% solids, pH 9.99, and molecular weight by GPC of Mn 4830 and PD 2.15.

Polyurethane Dispersant 2: IPDI/HEPS 80 AN APIZ

Loaded 2 L reactor with 136.3 g bis(hydroxyethoxy)phenyl sulfone (HEPS), 316.4 g Sulfolane (5% Proglyde DMM), 0.19 g dibutyl tin dilaurate, and 96.0 g dimethylol proprionic acid. The reaction was heated to 73° C. Over 25 minutes 267.8 g isophorone diisocyanate was added followed by 27 g Sulfolane (5% Proglyde DMM). The reaction was held at 81° C. for 1.5 hrs when the % NCO was 1.16%. Then, 200 g Sulfolane (5% Proglyde DMM) and 21.5 g aminopropyl imidazole was added over 10 minutes. The reaction was held at 80-90° C. for 3 hr when the % NCO was 0%. The polyurethane solution was inverted under high speed mixing by adding a mixture of 45% KOH (89.3 g) and 312.4 g water followed by an additional 739 g water and 2.0 g proxel GXL. The polyurethane dispersion had a viscosity of 809.8 cPs, 31.81% solids, pH 11.92, and molecular weight by GPC of Mn 6416 and PD 1.89.

Polyurethane Dispersant 3: Hi MW IPDI/HEPS T1000 APIZ 66AN

Loaded 2 L reactor with 118.59 g bis(hydroxyethoxy)phenyl sulfone (HEPS), 207.51 g Sulfolane (5% Proglyde DMM), 88.67 Terathane 1000, and 96.0 g dimethylol proprionic acid. The reaction was heated to 65° C. Over 30 minutes 212.5 g isophorone diisocyanate was added followed by 98.78 g Sulfolane (5% Proglyde DMM). The reaction was held at 85° C. for 7.5 hrs when the % NCO was 0%. Then, 17.96 g isophorone diisocyanate was added followed by 196.06 g Sulfolane (5% Proglyde DMM). The reaction was held at 85° C. for 7.5 hrs when the % NCO was 0%. 200 g Sulfolane (5% Proglyde DMM) and 21.5 g aminopropyl imidazole was added over 10 minutes. The reaction was held at 85° C. for 7.5 hrs when the % NCO was 0%. The reaction was held at 80-90° C. for 3 hr when the % NCO was 0.4%. Then, 1.6 g aminopropyl imidazole was added over 10 minutes. The polyurethane solution was inverted under high speed mixing by adding a mixture of 45% KOH (66.3 g) and 870.56 g water followed by an additional 173.5 g water and 2.0 g proxel GXL. The polyurethane dispersion had a viscosity of 2245 cPs, 20.2% solids and molecular weight by GPC of Mn 13363 and PD 2.64.

Polyurethane Dispersant 4: TMXDI/HEPS UH50 APIZ 45AN

Loaded 2 L reactor with 117.60 g bis(hydroxyethoxy)phenyl sulfone (HEPS), 319.26 g Sulfolane (5% Proglyde DMM), 76.29 g Eternacoll UH50 (500 MW Ube polycarbonate diol), 0.16 g dibutyl tin dilaurate, and 54.61 g dimethylol proprionic acid. After heating reaction mixture to 65° C., 267.8 g m-tetramethylene xylylene diisocyanate was added over 30 minutes followed by 40.80 g Sulfolane (5% Proglyde DMM). The reaction was held at 85-90° C. for 6.5 hrs when the % NCO was 0.93%. Then, 18.17 g aminopropyl imidazole was added over 10 minutes followed by 124.03 g Sulfolane (5% Proglyde DMM). The reaction was held at 85° C. for 2 hr. The polyurethane solution was inverted under high speed mixing by adding a mixture of 45% KOH (45.37 g) and 631.9 g water followed by an additional 469.21 g water and 2.09 g proxel GXL. The polyurethane dispersion had a viscosity of 222.4 cPs, 23.75% solids, pH 8.33, and molecular weight by GPC of Mn 5211 and PD 1.82.

Polyurethane Dispersant 5: TMXDI/HEPS T650 APIZ 45AN

Loaded 2 L reactor with 111.62 g bis(hydroxyethoxy)phenyl sulfone (HEPS), 354.74 g Sulfolane (5% Proglyde DMM), 90.75 g PolyTHF650 from BASF, 0.17 g dibutyl tin dilaurate, and 56.44 g dimethylol proprionic acid. After heating reaction mixture to 68° C., 228.49 g m-tetramethylene xylylene diisocyanate was added over 30 minutes followed by 39.96 g Sulfolane (5% Proglyde DMM). The reaction was held at 85-90° C. for 5 hrs. Then, 17.03 g aminopropyl imidazole was added over 10 minutes. The reaction was held at 80-90° C. for 2 hr. The polyurethane solution was inverted under high speed mixing by adding a mixture of 45% KOH (45.3 g) and 626.34 g water followed by an additional 435.33 g water. The polyurethane dispersion had a viscosity of 137 cPs, 24.28% solids, pH 7.97, and molecular weight by GPC of Mn 4360 and PD 1.80.

Polyurethane Dispersant 6: IPDI/HEPS T650 APIZ 68AN

Loaded 2 L reactor with 91.0 g bis(hydroxyethoxy)phenyl sulfone (HEPS), 387.7 g Sulfolane (5% Proglyde DMM), 72.9 g polyTHF650 (BASF), and 90.7 g dimethylol proprionic acid. The reaction was heated to 67° C. Over 30 minutes 235.7 g isophorone diisocyanate was added followed by 39.2 g Sulfolane (5% Proglyde DMM). The reaction was held at 80-90° C. for 2.5 hrs when the % NCO was 1.17%. Then, 19.1 g aminopropyl imidazole was added over 10 minutes. The reaction was held at 85° C. for 1 hr. The polyurethane solution was inverted under high speed mixing by adding a mixture of 45% KOH (67.5 g) and 945.8 g water followed by an additional 69.8 g water and 2.0 g proxel GXL. The polyurethane dispersion had a viscosity of 506.9 cPs, 26.87% solids, pH 8.88, surface tension of 43.9 dynes/cm and molecular weight by GPC of Mn 6328 and PD 2.3.

Polyurethane Dispersant 7: IPDI/HEPS T1000 APIZ 66AN

Loaded 2 L reactor with 99.8 g bis(hydroxyethoxy)phenyl sulfone (HEPS), 376.6 g Sulfolane (5% Proglyde DMM), 74.4 g Terathane 1000, and 78.3 g dimethylol proprionic acid. The reaction was heated to 65° C. Over 30 minutes 229.1 g isophorone diisocyanate was added followed by 37.7 g Sulfolane (5% Proglyde DMM). The reaction was held at 80-90° C. for 3 hrs. Then, 18.4 g aminopropyl imidazole was added over 10 minutes. The reaction was held at 85° C. for 1 hr. The polyurethane solution was inverted under high speed mixing by adding a mixture of 45% KOH (85.5 g) and 918 g water followed by an additional 103.8 g water and 2.0 g proxel GXL. The polyurethane dispersion had a viscosity of 251.9 cPs, 27.38% solids, pH 8.32, surface tension of 42.0 dynes/cm and molecular weight by GPC of Mn 5740 and PD 2.12.

Polyurethane Dispersant 8: IPDI/HEPS APIZ 50AN

Loaded 2 L reactor with 183.45 g bis(hydroxyethoxy)phenyl sulfone (HEPS), 198.8 g Sulfolane (5% Proglyde DMM), 0.17 g dibutyl tin dilaurate, and 60.2 g dimethylol proprionic acid. The reaction was heated to 73° C. Over 30 minutes 237.2 g isophorone diisocyanate was added followed by 24.0 g Sulfolane (5% Proglyde DMM). The reaction was held at 80-90° C. for 4 hrs during which time viscosity required dilution with 285 g Sulfolane (5% Proglyde DMM). Then, 19.1 g aminopropyl imidazole was added over 10 minutes. The reaction was held at 85° C. for 1 hr. The polyurethane solution was inverted under high speed mixing by adding a mixture of 45% KOH (56.0 g) and 924 g water followed by 2.0 g proxel GXL. The polyurethane dispersion had a viscosity of 133.5 cPs, 26.07% solids, pH 7.14, and molecular weight by GPC of Mn 6683 and PD 1.99.

Polyurethane Dispersant 9: TMXDI/DDS D230 70AN APIZ

Loaded 2 L reactor with 58.18 g 4,4'-Diaminodiphenyl sulfone (DDS, MW 248.3, Huntsman HT 976), 52.76 g Jeffamine D230 (polypropylene glycol diamine, 224.7 molecular weight based on amine titration on COA), 334.35 g tetraglyme, and 84.10 g dimethylol proprionic acid. The reaction was heated to 71.7° C. Over 30 minutes, 286.00 g toluemtetramethylene xylene diisocyanate was added followed by 46.91 g tetraglyme. The reaction was held at 85° C. for 5 hrs when the % NCO was less than 1.0%. Then, 20.89 g aminopropyl imidazole was added over 10 minutes. The reaction was held at 80-85° C. for 2 hr. The polyurethane solution was inverted under high speed mixing by adding a mixture of 45% KOH (69.94 g) and 917.23 g water followed by an additional 132.22 g water. The polyurethane dispersion had a viscosity of 62 cPs, 29.99% solids, pH 10.98, and surface tension of 44.76 dynes/cm.

Polyurethane Dispersant 10: TMXDI/DDS T650 70AN APIZ

Loaded 2 L reactor with 78.88 g 4,4'-Diaminodiphenyl sulfone (DDS, MW 248.3, Huntsman HT 976), 50.81 g polyTHF650 (BASF), 331 g tetraglyme, and 83.34 g dimethylol proprionic acid. The reaction was heated to 60° C. Over 30 minutes, 189.95 g m-tetramethylene xylene diisocyanate was added followed by 44.9 g tetraglyme. The reaction was held at 85° C. for 6 hrs when the % NCO was less than 1.1%. Then, 20.09 g aminopropyl imidazole was added over 10 minutes. The reaction was held at 80-85° C. for 1 hr. The polyurethane solution was inverted under high speed mixing by adding a mixture of 45% KOH (70.0 g) and 1121.42 g water. The polyurethane dispersion had a viscosity of 111 cPs, 30.46% solids, pH 9.33, surface tension of 42.49 dynes/cm, and molecular weight by GPC of Mn 4414 and PD 1.70.

Polyurethane Dispersant 11: TMXDI/DDS APIZ 70AN

Loaded 2 L reactor with 131.44 g 4,4'-Diaminodiphenyl sulfone (DDS, MW 248.3, Huntsman HT 976), 175.09 g dry NMP, and 71.37 g dimethylol proprionic acid. The reaction was heated to 73° C. Over 45 minutes, 278.87 g m-tetramethylene xylene diisocyanate was added followed by 46.27 g dry NMP. The reaction was held at 85° C. for 6 hrs when the % NCO was less than 1.1%. Then, 20.09 g aminopropyl imidazole was added over 10 minutes. The reaction was held at 80-85° C. for 6 hr. The polyurethane solution was inverted under high speed mixing by adding a mixture of 45% KOH (59.24 g) and 829.41 g water followed by another 390.8 g water. The polyurethane dispersion had a viscosity of 15.3 cPs, 29.22% solids, pH 10.78, surface tension of 43.92 dynes/cm, and molecular weight by GPC of Mn 2400 and PD 1.39.

Polyurethane Dispersant 12: IPDI/DDS T650 70AN APIZ

Loaded 2 L reactor with 83.23 g 4,4'-Diaminodiphenyl sulfone (DDS, MW 248.3, Huntsman HT 976), 57.51 g polyTHF650 (BASF), 343.14 g tetraglyme, and 83.48 g dimethylol proprionic acid. The reaction was heated to 64° C. Over 30 minutes, 253.69 g isophorone diisocyanate was added followed by 41.65 g tetraglyme. The reaction was held at 85° C. for 5.5 hrs when the % NCO was 0.66%. Then, 21.23 g aminopropyl imidazole was added over 10 minutes followed by 225.4 g tetraglyme to reduce viscosity. The reaction was held at 85° C. for 1 hr. The polyurethane solution was inverted under high speed mixing by adding a mixture of 45% KOH (69.04 g) and 721.52 g water followed by 201.4 g water. The polyurethane dispersion had a viscosity of 5179 cPs, 26.95% solids, pH 10.28, surface tension of 42.68 dynes/cm, and molecular weight by GPC of Mn 4232 and PD 2.28.

Polyurethane Dispersant 13: TMDI/DDS T650 70AN APIZ

Loaded 2 L reactor with 92.07 g 4,4'-Diaminodiphenyl sulfone (DDS, MW 248.3, Huntsman HT 976), 59.77 g polyTHF650 (BASF), 352.42 g tetraglyme, and 82.53 g dimethylol proprionic acid. The reaction was heated to 66° C. Over 30 minutes, 245.66 g Vestanat TMDI (2,2,4-Trimethyl-hexamethylene diisocyanate & 2,4,4-isomer) was added followed by 42.0 g tetraglyme. The reaction was held at 80-90° C. for 3 hrs. Then, 21.3 g aminopropyl imidazole was added over 10 minutes. The reaction was held at 85° C. for 1.5 hr. The polyurethane solution was inverted under high speed mixing by adding a mixture of 45% KOH (71.58 g) and 973.18 g water followed by 74.76 g water. The polyurethane dispersion had a viscosity of 54.4 cPs, 28.66% solids, pH 9.36, surface tension of 46.62 dynes/cm, and molecular weight by GPC of Mn 4710 and PD 2.03.

Polyurethane Dispersant 14: TMXDI/DDS UH50 APIZ 50AN

Loaded 2 L reactor with 83.71 g 4,4'-Diaminodiphenyl sulfone (DDS, MW 248.3, Huntsman HT 976), 86.66 g Eternacoll UH50 (500 MW Ube polycarbonate diol), 221.5 g Sulfolane (5% Proglyde DMM), and 67.3 g dimethylol proprionic acid. The reaction was heated to 68° C. Over 30 minutes, 263.4 g m-tetramethylene xylene diisocyanate was added followed by 22.0 g Sulfolane (5% Proglyde DMM). The reaction was held at 80-85° C. for 2.5 hrs. Then, 21.23 g aminopropyl imidazole was added over 10 minutes followed by 120 g Sulfolane (5% Proglyde DMM). The reaction was held at 85° C. for 1.5 hr. The polyurethane solution was inverted under high speed mixing by adding a mixture of 45% KOH (62.4 g) and 230 g water followed by 826.5 g water and 2.00 g Proxel GXL. The polyurethane dispersion had a viscosity of 46.5 cPs, 26.40% solids, pH 9.4, surface tension of 46.62 dyne/cm and molecular weight by GPC of Mn 5191 and PD 1.78.

Polyurethane Dispersant 15: TMXDI/HEPS APIZ 56AN

Loaded 2 L reactor with 169.4 g bis(hydroxyethoxy)phenyl sulfone (HEPS), 57.51 g polyTHF650 (BASF), 221.5 g Sulfolane (5% Proglyde DMM), and 67.3 g dimethylol proprionic acid. The reaction was heated to 68° C. Over 30 minutes, 263.4 g m-tetramethylene xylene diisocyanate was added followed by 22.0 g Sulfolane (5% Proglyde DMM). The reaction was held at 80-85° C. for 2.5 hrs. Then, 21.23 g aminopropyl imidazole was added over 10 minutes followed by 120 g Sulfolane (5% Proglyde DMM). The reaction was held at 85° C. for 1.5 hr. The polyurethane solution was inverted under high speed mixing by adding a mixture of 45% KOH (62.4 g) and 230 g water followed by 826.5 g water and 2.00 g Proxel GXL. The polyurethane dispersion had a viscosity of 2509 cPs, 27.79% solids, pH 9.15, and molecular weight by GPC of Mn 3862 and PD 1.74.

Polyurethane Dispersant 16: 14IPDI/T650 10% DEA 45 AN APIZ

Loaded 2 L reactor with 137.3 g polyTHF650 (BASF), 92.28 g Tetraethylene glycol dimethyl ether, 2.60 g diethanol amine, 0.08 g dibutyl tin dilaurate, and 92.94 g dimethylol propionic acid. The reaction was heated to 78° C. Over 45 minutes 117.0 g isophorone diisocyanate was added followed by 9.58 g Tetraethylene glycol dimethyl ether. The reaction was held at 85° C. for 5 hrs when the % NCO was 0.98%. Then, 13.06.4 g aminopropyl imidazole was added over 10 minutes. The reaction was held at 80° C. for 3 hr. The polyurethane solution was inverted under high speed mixing by adding a mixture of 45% KOH (27.2 g) and 281.6 g water followed by an additional 503.2 g water and 2.0 g Proxel GXL. The polyurethane dispersion had a viscosity of 26.2 cPs, 25.93% solids, pH 10.41, surface tension of 43.16 dynes/cm, and molecular weight by GPC of Mn 8241 and PD 2.92.

Polyurethane Dispersant 17: IPDI/T650 25% DEA 60 AN APIZ

Loaded 2 L reactor with 163.39 g polyTHF650 (BASF), 211.15 g Tetraethylene glycol dimethyl ether, 8.98 g diethanol amine, and 71.79 g dimethylol propionic acid. The reaction was heated to 69° C. Over 30 minutes 232.64 g isophorone diisocyanate was added followed by 29.05 g Tetraethylene glycol dimethyl ether. The reaction was held at 87-89° C. for 4 hrs when the % NCO was 2.13%. Then, 47.0 g aminopropyl imidazole was added over 10 minutes followed by 179.8 g Tetraethylene glycol dimethyl ether. The reaction was held at 80° C. for 2.5 hr. The polyurethane solution was inverted under high speed mixing by adding a mixture of 45% KOH (57.4 g) and 608.5 g water followed by an additional 573.2 g water and 2.0 g Proxel GXL. The polyurethane dispersion had a viscosity of 46.9 cPs, 24.98% solids, pH 13.03, surface tension of 41.93 dynes/cm, and molecular weight by GPC of Mn 7220 and PD 3.43. The pre-inversion polyurethane had an acid number of 60.03 mg KOH/g solids.

Polyurethane Dispersant 18: 14IPDI/GC-APIZ Diol T650 80 AN APIZ

Diol from Glycerin Carbonate and Aminopropyl imidazole (GC-APIZ diol) Loaded a 1 L reactor with 141.77 g Sulfolane and 198.0 g aminopropyl imidazole. The mixture was heated to 49.5° C., and the 186.6 g glycerin carbonate (Jeffasol GC® from Huntsman) was added over 10 minutes. The reaction mixture was heated at 75-80 C for 10 hr at which time FTIR analysis verified disappearance of carbonate and formation of dominate carbamate peak from 2,3-dihydroxypropyl [3-(1H-imidazol-1-yl)propyl]carbamate).

Loaded 2 L reactor with 64.25 g polyTHF650 (BASF), 516.45 g Sulfolane, 139.12 g GC-APIZ diol (above prep at 70.65%), and 71.9 g dimethylol proprionic acid. The reaction was heated to 60.6° C. Over 30 minutes 248.25 g isophorone diisocyanate during which the reaction exothermed to 89° C. was added followed by 41.83 g Sulfolane. The reaction was held at 80° C. for 2.5 hrs when the uncorrected % NCO reading was −0.37%. Then, 20.15 g aminopropyl imidazole was added over 10 minutes. After another 2 hr at 85° C., the polyurethane solution was inverted under high speed mixing by adding a mixture of 45% KOH (59.7 g) and 452.68 g water followed by an additional 390.56 g water and 2.44 g proxel GXL. The polyurethane dispersion had a viscosity of 130.2 cPs, 27.43% solids, and pH 8.81.

The properties of polyurethane Dispersants 1-18 are listed in Table 1 below.

TABLE 1

| Dispersant No. | Polymer Description | Solids | GPC Mn | GPC PD | pH | Viscosity |
|---|---|---|---|---|---|---|
| 1 | TMDI/GC-ApizDiol HEPS APIZ 60AN | 23.54% | 4,830 | 2.15 | 9.99 | 114 |
| 2 | IPDI HEPS 80AN APIZ | 23.02% | 6,796 | 2.04 | 13.45 | 1175 |
| 3 | Hi MW IPDI/HEPS T1000 APIZ 66AN | 25.98% | 13,363 | 2.64 | NA | 2245 |
| 4 | TMXDI/HEPS UH50 APIZ 45AN | 23.75% | 5,211 | 1.82 | 8.33 | 222.4 |
| 5 | TMXDI/HEPS T650 APIZ 50AN | 24.28% | 4,360 | 1.80 | 7.97 | 137 |
| 6 | IPDI/HEPS T650 APIZ 68AN | 26.87% | 6328 | 2.30 | 11.88 | 45 |
| 7 | IPDI/HEPS T1000 APIZ 63AN | 27.36% | 5740 | 2.12 | 8.32 | 251.9 |
| 8 | IPDI/HEPS APIZ 50AN | 25.78% | 6683 | 1.99 | 7.14 | 133.5 |
| 9 | TMXDI/DDS T650 70AN APIZ | 30.12% | 4,414 | 1.70 | 9.33 | 111 |
| 10 | TMXDI/DDS D230 70AN APIZ | 30.00% | | | 10.98 | 621 |
| 11 | TMXDI/DDS APIZ | 29.55% | 2,400 | 1.39 | 10.78 | 15.3 |
| 12 | IPDI/DDS T650 70AN APIZ | 26.95% | 4,232 | 2.28 | 10.28 | 5179 |
| 13 | TMDI/DDS T650 70AN APIZ | 28.66% | 4,710 | 2.03 | 9.36 | 54.4 |
| 14 | TMXDI/DDS UH50 APIZ 50AN | 26.40% | 5,191 | 1.78 | 9.4 | 46.5 |
| 15 | TMXDI/HEPS APIZ 56AN | 27.79% | 3862 | 1.74 | NA | NA |
| 16 | 14IPDI/T650 10% DEA 45 AN APIZ | 25.93% | 8241 | 2.92 | 10.4 | 26.2 |
| 17 | 6IPDI/T650 25% DEA 60 AN APIZ | 24.98% | 7220 | 3.43 | 13.0 | 46.9 |
| 18 | 14IPDI/GC-APIZ diol T650 80 AN APIZ | 27.43% | 4191 | 2.25 | 8.8 | 130.2 |

The 18 dispersants listed in Table 1 were used to prepare pigment dispersions of cyan, magenta and yellow in color. Table 2A listed magenta dispersions prepared using an Eiger Mill with P/D of 2.5 using Clariant E02 PR122 pigment.

TABLE 2A

| Dispersion No. | Dispersant No. | Dispersant Structure |
|---|---|---|
| M14 | 15 | TMXDI/HEPS APIZ 56AN |
| M11 | 14 | TMXDI/DDS UH50 APIZ 50AN |
| M6 | 4 | TMXDI/HEPS UH50 APIZ 45AN |
| M5 | 3 | Hi MW IPDI/HEPS T1000 APIZ 66AN |
| M5 UF | 3 | Hi MW IPDI/HEPS T1000 APIZ 66AN |
| M3 | 13 | TMDI/DDS T650 70AN APIZ |
| M1 | 7 | IPDI/HEPS T1000 APIZ 63AN |
| M2 | 6 | IPDI/HEPS T650 APIZ 68AN |
| M10 | 8 | IPDI/HEPS APIZ 50AN |
| M4 | 10 | TMXDI/DDS D230 70AN APIZ |
| M12 | 12 | IPDI/DDS T650 70AN APIZ |
| M8 | 11 | TMXDI/DDS APIZ |
| M13 | 2 | IPDI HEPS 80AN APIZ |
| M15 | 16 | 14IPDI/T650 10% DEA 45 AN APIZ |
| M16 | 17 | 6IPDI/T650 25% DEA 60 AN APIZ |
| M17 | 18 | 14IPDI/GC-APIZ diol T650 80 AN APIZ |

Table 2B listed cyan and yellow pigment dispersions prepared.

TABLE 2B

| Dispersion No. | Dispersant No. | Dispersant Structure | Pigment |
|---|---|---|---|
| C1 | 2 | IPDI HEPS 80AN APIZ | DNS TRB-2 |
| Y1 | 2 | IPDI HEPS 80AN APIZ | SUN 272-5147 |
| Y2 | 6 | IPDI/HEPS T650 APIZ 68AN | SUN 272-5147 |
| C2 | 2 | IPDI/HEPS APIZ | DB 60 |
| C3 | 6 | IPDI/HEPS T650 APIZ 68AN | DNS TRB-2 |

The properties of all pigment dispersions were listed in Table 3 below.

TABLE 3

| Pigment Dispersion | D50 | D95 | Accu | Solids | % P | ST (dyne/cm) | pH | Cond (mS) | Visc (cP) |
|---|---|---|---|---|---|---|---|---|---|
| M1 | 126.1 | 198.5 | 20.5 | 14.72 | 10.5 | 49.55 | 9.31 | 1.81 | 2.8 |
| M2 | 112.4 | 211.0 | 21.0 | 17.29 | 12.4 | 46.14 | 9.28 | 2.61 | 3.04 |
| M3 | 110.8 | 206.3 | 7.4 | 14.61 | 10.44 | 44.12 | 9.01 | 1.88 | 3.1 |
| M4 | 108.0 | 182.0 | 8.1 | 17.06 | 12.2 | 44.44 | 9.27 | 2.12 | 3.96 |
| M5 | 107.4 | 186.2 | 3.3 | 14.54 | 10.39 | 43.68 | 8.44 | 1.93 | 3.08 |
| M6 | 107 | 208 | 8 | 17.15 | 12.25 | 43.8 | 8.95 | 1.85 | 4.38 |
| M7 | 105.7 | 192.7 | 19.8 | 13.62 | 9.73 | 43.51 | 9.58 | 2.79 | 2.91 |
| M8 | 102.8 | 202.4 | 10.7 | 16.85 | 12.0 | 45.03 | 9.1 | 1.65 | 4.91 |
| M9 | 102.5 | 194.1 | 16.7 | 18.64 | 13.31 | 43.96 | 10.24 | 3.68 | 3.95 |
| M10 | 100.4 | 185.4 | 13.4 | 17.44 | 12.5 | 44.18 | 9.35 | 1.38 | 3.89 |
| M11 | 100 | 198 | 3.8 | 18.00 | 12.86 | 44.1 | 9.09 | 1.66 | 4.33 |
| M12 | 95.7 | 189.9 | 1.8 | 17.77 | 12.7 | 42.95 | 9.5 | 1.94 | 4.81 |
| M13 | 93.0 | 195.4 | 15.4 | 17.5 | 12.5 | 43.5 | 8.99 | 2.66 | 3.38 |
| M14 | 86 | 198 | 27 | NA | 12.9 | 39.9 | 8.65 | 1.95 | 4.46 |
| M15 | 99 | 176 | 8 | 17.26 | 12.33 | 41.89 | 9.2 | 1.72 | 4.26 |
| M16 | 84 | 171 | 4 | 17.51 | 12.51 | 41.30 | 10.1 | 2.39 | 4.14 |
| M17 | 113 | 203 | 27 | 17.35 | 12.39 | NA | 9.61 | 2.74 | NA |
| C1 | 63.4 | 146.7 | 124.0 | 16.93 | 12.1 | 43.44 | 9.04 | 2.67 | 2.88 |
| Y1 | 72.5 | 156.4 | 3.4 | 18.62 | 13.3 | 42.08 | 8.98 | 3.16 | 3.88 |
| Y2 | 102 | 202 | 7 | 17.23 | 12.92 | 40.7 | 8.32 | 1.72 | 2.7 |
| C2 | 85 | 182 | NA | 19.42 | NA | 38.7 | 10.35 | 4.09 | 5.41 |
| C3 | 76.0 | 152.6 | 114.3 | 14.83 | 10.59 | 43.25 | 8.75 | 2.25 | NA |

The Pigment dispersions in Table 3 were used to prepare Inks M1-17, C1-2 and Y1-2. Ink ingredients were listed in Table 4 below as % by weight based on the total weight of ink.

TABLE 4

| Ingredients | Epson printer ink | HP printer ink |
|---|---|---|
| Dispersion | 4.5% | 4.2% |
| 2-pyrrolidone | 9% | 8.50% |
| Glycereth-26 (LEG-1) | 5% | 2% |
| Tetraethylene glycol | — | 3% |
| 1-(2-hydroxyethyl)-2-pyrrolidone | — | 8% |
| 1,6-hexanediol | — | 3% |
| Surfactants | | |
| Surfynol SE-F | 0.40% | 0.38% |
| Surfynol 465 | 0.70% | — |
| Zonyl FSO | 0.10% | 0.20% |
| Biocide | | |
| Proxel GXL | 0.20% | 0.20% |
| De-ionized Water | Balance to 100% | |

Inks M1-17 were printed using an Epson B310 printer for single pass printing and an HP8000 for four pass printing. Single pass print results for these inks were summarized in Tables 5A, 5B and 5C below.

TABLE 5A

| Ink | HP-MP OD | Xerox 4200 Saturation | HP-MP Saturation | HP Bright White Saturation | Oce Red Label Saturation |
|---|---|---|---|---|---|
| Ink M1 | 0.88 | 0.99 | 1.10 | 1.19 | 0.82 |
| Ink M2 | 0.98 | 1.06 | 1.22 | 1.27 | 0.85 |
| Ink M3 | 0.94 | 1.03 | 1.18 | 1.26 | 0.84 |
| Ink M4 | 0.99 | 1.00 | 1.22 | | 0.86 |
| Ink M5 | 1.00 | 1.03 | 1.25 | 1.30 | 0.86 |
| Ink M6 | 0.93 | 1.03 | 1.17 | 1.18 | 0.83 |
| Ink M8 | 0.95 | 1.00 | 1.18 | | 0.85 |
| Ink M10 | 0.97 | 1.03 | 1.22 | 1.28 | 0.94 |
| Ink M11 | 0.98 | 1.00 | 1.21 | 1.27 | 0.83 |
| Ink M12 | 0.93 | 0.98 | 1.17 | | 0.80 |
| Ink M13 | 1.00 | 1.02 | 1.23 | | 0.90 |
| Ink M14 | 0.86 | 0.99 | 1.10 | 1.13 | 0.84 |

TABLE 5B

| | Saturation | | | |
|---|---|---|---|---|
| Ink | Xerox 4200 | HP Multipurpose | HP Bright White | HP Brochure |
| M15 | 0.98 | 1.02 | 1.03 | 1.18 |
| M16 | 0.90 | 1.02 | 1.09 | 1.10 |
| M17 | 0.90 | 0.90 | 0.99 | 0.92 |

TABLE 5C

| Ink | Oce Red Label Saturation | HP universal Bond Saturation | Area Coverage (1 Pass) | Average 1-Pass Saturation |
|---|---|---|---|---|
| M15 | | | 6.8 | 1.05 |
| M16 | | | 6.8 | 1.03 |
| M17 | 0.72 | 0.79 | 6.30 | 0.87 |

Print results from four pass printing of Inks M15-17 were summarized in Table 6 below.

TABLE 6

| Ink | Saturation | | | |
|---|---|---|---|---|
| | Xerox 4200 | HP Multipurpose | HP Bright White | HP Brochure |
| M15 | 1.12 | 1.15 | 1.14 | 1.49 |
| M16 | 1.11 | 1.15 | 1.21 | 1.40 |
| M17 | 1.09 | 1.12 | 1.20 | 1.44 |

Similarly, cyan Inks C1-C2, and yellow Inks Y1-Y2 were prepared from Dispersions C1-C2 and Y1-Y2. Single pass print results of these inks were summarized in Table 7 below.

TABLE 7

| Ink | Ink C1 | Ink C2 | Ink Y1 | Ink Y2 |
|---|---|---|---|---|
| HP-MP OD | 1.14 | 1.09 | 0.96 | |
| Xerox 4200 Saturation | 0.90 | 0.87 | 0.85 | 0.81 |
| HP-MP Saturation | 1.06 | 1.02 | 0.99 | 0.94 |
| HP Bright White Saturation | | 1.06 | 0.99 | 0.97 |
| Oce Red Label saturation | 0.75 | 0.73 | 0.76 | 0.71 |
| HP Universal Bond Magenta | 1.02 | 1.02 | 1.00 | 0.93 |
| Nozzles Out @ 80 Pages | 7 | 2 | 0 | −1 |
| Mean Width Deviation | 45 | 54 | 20 | 19 |
| Dot Number Deviation | 13 | 29 | 24 | 15 |
| Trajectory rating | 22 | 35 | 15 | 10 |

What is claimed is:

1. An aqueous pigment dispersion comprising a colorant and a polyurethane dispersant, wherein said polyurethane dispersant comprises at least one compound of the general structure of Formula I:

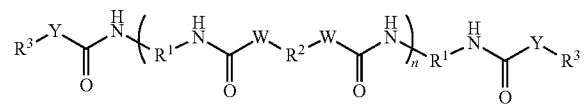

(I)

each Y is independently O, S or $NR^4$;
each W is N, O or S;
n is an integer from 2 to 30;
each $R^1$ is independently $C_1$-$C_{20}$ alkyl optionally substituted with one or more $R^5$, $OR^6$, $SR^6$ or $NR^7R^8$, or $C_6$-$C_{40}$ aryl optionally substituted with one or more $R^5$, $OR^6$, $SR^6$ or $NR^7R^8$;
each $R^2$ is comprised of difunctional isocyanate reactants $Z^1$, $Z^2$ and $Z^3$, wherein
$Z^1$ is a difunctional isocyanate reactant substituted with an aqueous dispersing ionic group, and $Z^1$ is present in between 5 to 40 weight percent of total weight of the polyurethane dispersant;
$Z^2$ is a difunctional or trifunctional isocyanate reactant selected from the group consisting of diol, diamine, amino alcohol, diamine alcohol, and amino dialcohol, and $Z^2$ is present in between 0 to 40 weight percent of total weight of the polyurethane dispersant; and
$Z^3$ is a difunctional isocyanate reactant substituted with $R^3$, and $Z^3$ is present in between 5 to 40 weight percent of total weight of the polyurethane dispersant; and
each $R^3$ is independently a monocyclic or bicyclic heterocycle containing N, S or O atoms on the ring bonding via a carbon or heteroatom to Y or $Z^2$ either directly or via a linking group containing 1-10 carbon atoms, wherein said heterocycle is selected from the group consisting of imidazolidinone, oxazolidinone, thiazolidinone, triazole, thiazole, pyridazine, and glycoside, and wherein the carbon atoms on the ring of said heterocycle are optionally substituted with one or more $R^5$, $OR^6$, $SR^6$ or $NR^7R^8$, and the N atom or atoms on the ring of said heterocycle are optionally substituted with $R^5$ or —$R^9OR^6$;
each $R^5$ is independently $C_1$-$C_{20}$ alkyl, $C_3$-$C_{20}$ cycloalkyl or $C_6$-$C_{40}$ aryl;
each $R^6$ is independently H, $C_1$-$C_{20}$ alkyl, $C_3$-$C_{20}$ cycloalkyl or $C_6$-$C_{40}$ aryl; and
each $R^7$ and $R^8$ are independently H, $C_1$-$C_{20}$ alkyl, $C_2$-$C_{20}$ cycloalkyl or $C_6$-$C_{40}$ aryl; and
each $R^9$ is $C_1$-$C_5$ alkyl.

2. The pigment dispersion of claim 1 wherein $R^2$ further comprises $Z^4$, and $Z^4$ is a difunctional or trifunctional isocyanate reactant selected from the group consisting of a diol that contains a sulfone and a diamine that contains a sulfone.

3. The pigment dispersion of claim 2 wherein $Z^4$ is a diol that contains a sulfone.

4. The aqueous pigment dispersion of claim 1 wherein said polyurethane dispersant is substituted with one or more crosslinkable moieties, and said crosslinkable moieties are selected from the group consisting of acetoacetoxy, acid, amine, epoxy, hydroxyl, blocked isocyanates, and mixtures thereof.

5. The aqueous pigment dispersion of claim 4 wherein said polyurethane dispersant with substituted crosslinkable moieties is reacted with a crosslinking agent, and wherein said crosslinking agent is selected from a group consisting of acetoacetoxy, acid, amine, anhydride, epoxy, hydroxyl, isocyanates, blocked isocyanates and mixtures thereof.

6. The aqueous pigment dispersion of claim 1 wherein said heterocycle is oxazolidinone.

7. The aqueous pigment dispersion of claim 1 wherein said heterocycle is imidazolidinone.

8. The aqueous pigment dispersion of claim 1 wherein said heterocycle is thiazole.

9. The aqueous pigment dispersion of claim 1 wherein said heterocycle is pyridazine.

10. The aqueous pigment dispersion of claim 1 wherein said heterocycle is glycoside.

* * * * *